US012724673B2

(12) United States Patent
Srinivasan et al.

(10) Patent No.: US 12,724,673 B2
(45) Date of Patent: Sep. 1, 2026

(54) DETECTING MISSING SEGMENTS AND IDENTIFYING FILES IMPACTED BY THE MISSING SEGMENTS USING A SINGLE PASS DISTRIBUTED SCAN

(71) Applicant: Dell Products L.P., Round Rock, TX (US)

(72) Inventors: Srikanth Srinivasan, Bangalore (IN); Chuanbo Jack Zheng, Cupertino, CA (US); Heta Saraiya, Livermore, CA (US); Ved Prakash Tanti, Hooghly (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/036,545

(22) Filed: Jan. 24, 2025

(65) Prior Publication Data

US 2026/0219995 A1 Jul. 30, 2026

(51) Int. Cl.
*G06F 11/1446* (2026.01)
*G06F 16/174* (2019.01)

(52) U.S. Cl.
CPC ...... *G06F 11/1453* (2013.01); *G06F 16/1752* (2019.01); *G06F 2201/80* (2013.01); *G06F 2201/82* (2013.01)

(58) Field of Classification Search
CPC ............... G06F 11/004; G06F 11/1453; G06F 16/1752; G06F 2201/80; G06F 2201/82
See application file for complete search history.

(56) References Cited

U.S. PATENT DOCUMENTS 10,496,283 B2 * 12/2019 Waghulde ............... G06F 3/061
10,592,353 B2 * 3/2020 Martin ................ G06F 11/1451
11,593,332 B1 * 2/2023 Shilane ............... G06F 16/2255

* cited by examiner

*Primary Examiner* — Joseph R Kudirka
(74) *Attorney, Agent, or Firm* — Chamberlain, Hrdlicka, White, Williams & Aughtry; Aly Z. Dossa

(57) ABSTRACT

A method for managing data in a storage system includes: partitioning segments to generate buckets; assigning a portion of the buckets to a first storage node; collecting a partition of the segments assigned as child segments; identifying: a first set of child segments that maps to the portion of the buckets, and a second set of child segments that maps to a bucket of a second storage node; storing: each of the first set of child segments to an LSM tree of the first storage node, the second set of child segments to a buffer; sending the second set of child segments to the second storage node; receiving a third set of child segments from the second storage node; comparing the first set of child segments and third set of child segments of the LSM tree against second child segments; and making a determination that a mismatch is occurred.

20 Claims, 9 Drawing Sheets

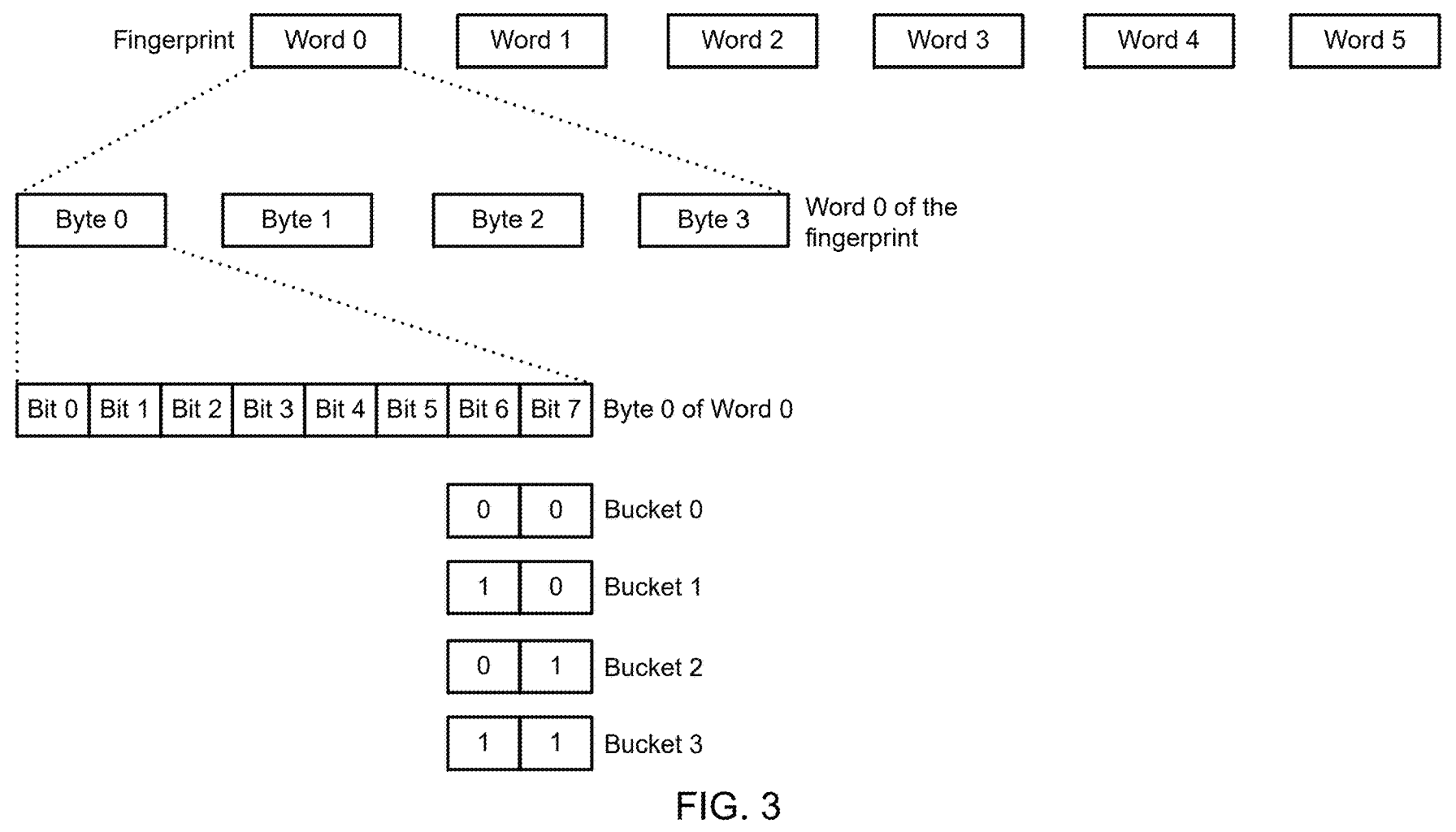

Fingerprint

Word 0 Word 1 Word 2 Word 3 Word 4 Word 5

Word 0 of the fingerprint

Byte 0 Byte 1 Byte 2 Byte 3

Byte 0 of Word 0

Bit 0 Bit 1 Bit 2 Bit 3 Bit 4 Bit 5 Bit 6 Bit 7

Bucket 0: 0 0

Bucket 1: 1 0

Bucket 2: 0 1

Bucket 3: 1 1

FIG. 3

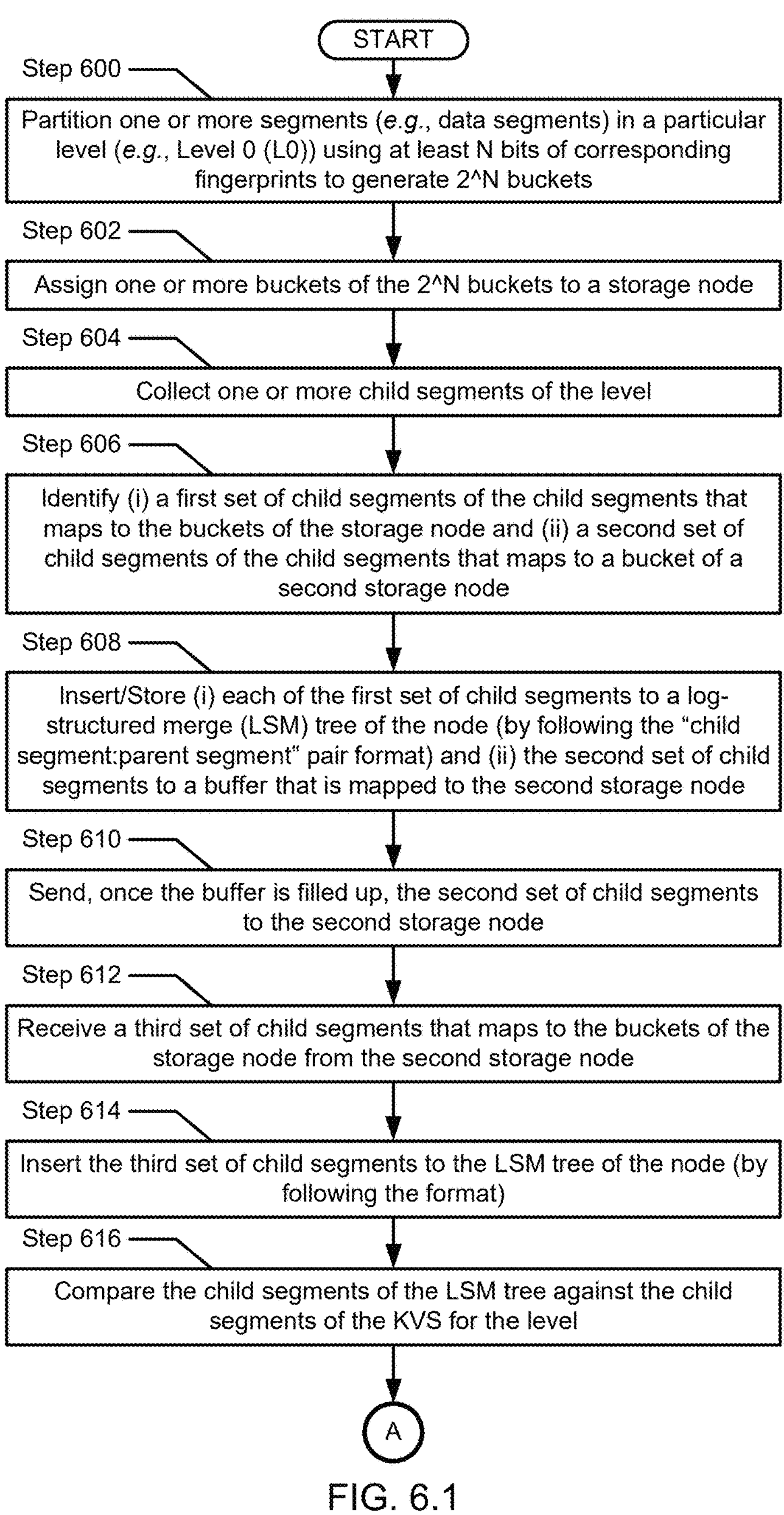
FIG. 6.1

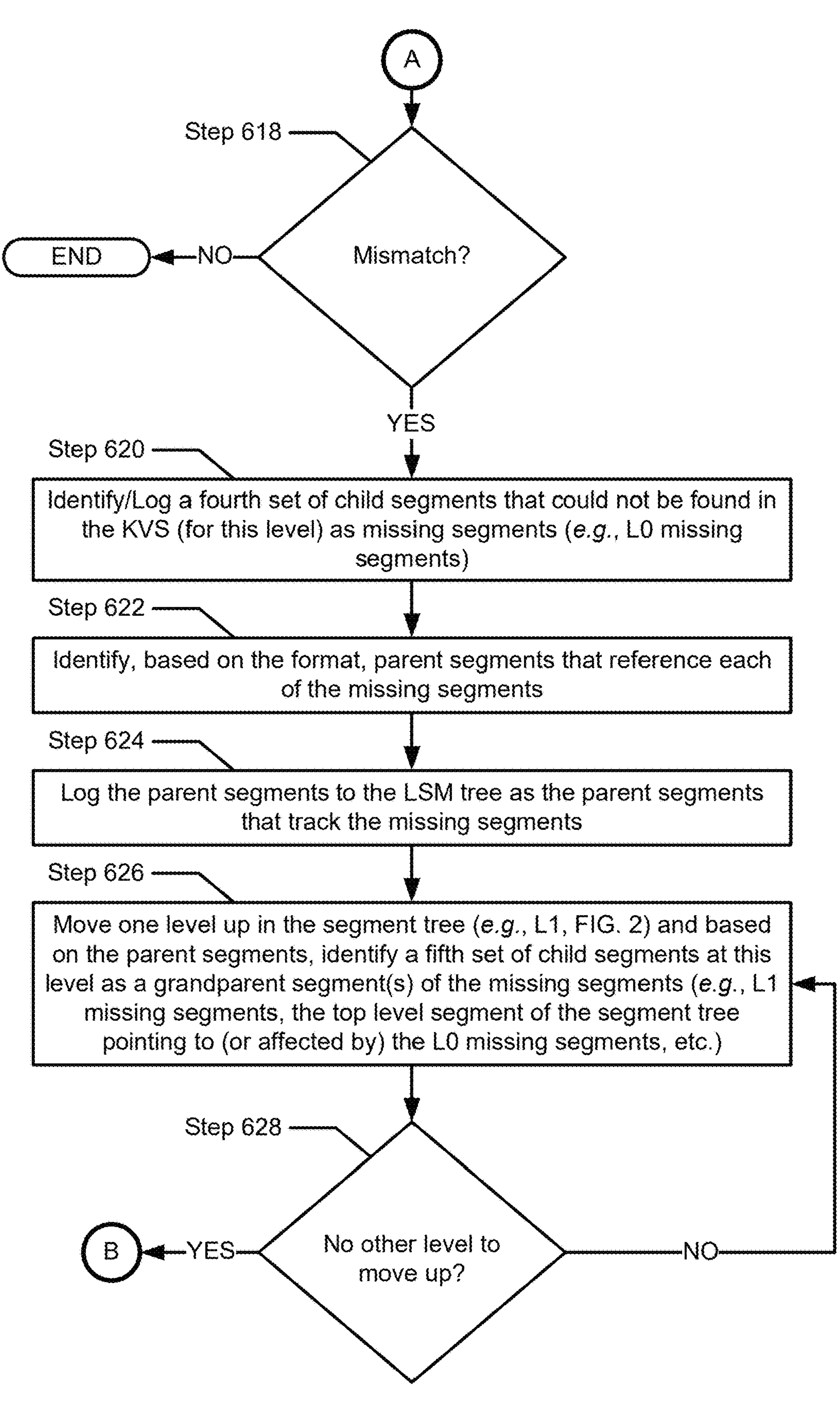
FIG. 6.2

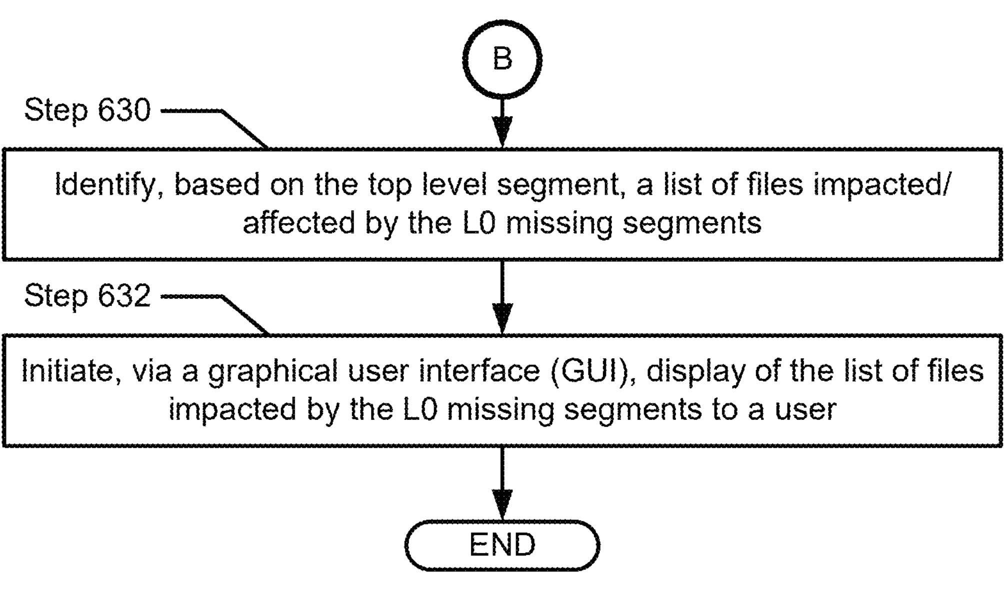
FIG. 6.3

DETECTING MISSING SEGMENTS AND IDENTIFYING FILES IMPACTED BY THE MISSING SEGMENTS USING A SINGLE PASS DISTRIBUTED SCAN

BACKGROUND

Devices are often capable of performing certain functionalities that other devices are not configured to perform or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 3 shows an example segment dataset bucketization in accordance with one or more embodiments disclosed herein.

FIGS. 6.1-6.3 show a method for managing data in a storage system in accordance with one or more embodiments disclosed herein.

DETAILED DESCRIPTION

Figure 1:
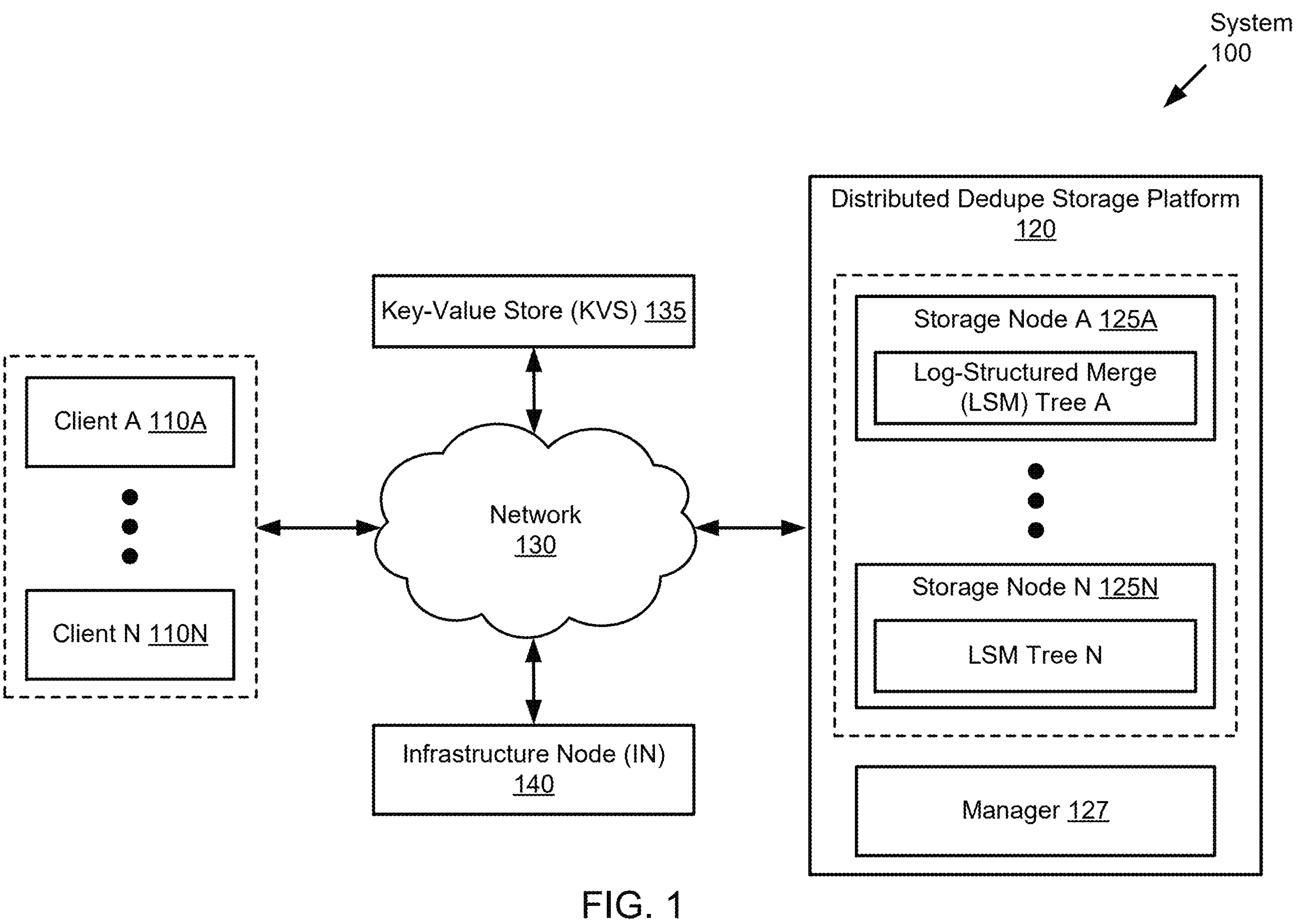
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a file system of a distributed dedupe storage system uses a segregated architecture to store metadata and/or data associated with each asset (e.g., a file, a folder, etc.). In a distributed dedupe storage system, files may be stored as a segment tree where the lowest level of the tree may be a hash of data (e.g., user data, application data, etc.), and the intermediate levels of the tree may be hashes of its child nodes (e.g., child segments). When a segment (e.g., a data chunk, a data segment, etc.) is still referenced by one or more parent segments (in the tree) but gets deleted (e.g., erroneously or intentionally) from the distributed dedupe storage system, it may introduce a corruption (e.g., a hardware issue, a software issue, an inconsistency, etc.) across the storage system. As indicated, an efficient way/framework is needed to (i) verify the integrity of all the files (in the storage system), (ii) detect the missing segments in a single pass (e.g., if there is a reference from a parent segment to a child segment and the child segment does not exist (in the storage system), the child segment may be called a missing segment), and identify files impacted by these missing segments.

While no solutions/approaches exist for distributed dedupe storage systems (for at least the aforementioned issue(s)), some of the existing solutions try to detect a missing segment in a given storage system as following: (i) logical file verification (FV): the FV approach may verify the integrity of each file by traversing the segments from the root and check whether all the child segments are reachable (given the logical nature of this approach, FV can be extremely slow), (ii) probabilistic file verification (PFV): the PFV approach may use a bit vector based on perfect hashing (PHVEC) to mark the reference segments and search for missing segments by flipping the bits mapped in the related PHVEC ((a) where PHVECs may be generated based on existing dataset and introduce a probability of collision when segments are missing and (b) the PFV approach may need excessive computation time to generate one or more PHVECs), and (iii) comprehensive file verification (fs-verify): as being an offline tool/approach, the fs-verify approach may operate on top of one or more index buckets. As discussed, none of the above approaches has distributed processing capabilities (indicating none of them is useful for distributed dedupe storage systems/platforms) and can detect missing segments (while identifying corresponding impacted files) in a single pass.

For at least the reasons discussed above and without requiring resource-intensive efforts (e.g., time, engineering, etc.), a fundamentally different approach/framework is needed (e.g., an approach for storage systems (especially for distributed dedupe storage systems) to (i) detect missing segments using distributed processing, (ii) detect files impacted by such missing segments using distributed processing, (iii) perform (i)-(ii) in a single pass, and (iv) perform (i)-(iii) efficiently with a related file system being online while being flexible on memory consumption (of related storage nodes)).

Embodiments disclosed herein relate to methods and systems to manage data in a storage system/platform. As a result of the processes discussed below, one or more embodiments disclosed herein advantageously ensure that: (i) the framework detects missing segments (e.g., in a distributed dedupe storage platform) using distributed processing; (ii) the framework verifies integrity of all the files (in the storage platform); (iii) the framework identifies/detects one or more files impacted by the missing segments using distributed processing; (iv) the framework performs (i) and (iii) in a single pass; (v) the framework performs (i), (iii), and (iv) efficiently with a related file system being online while being flexible on memory consumption (e.g., the framework can enable data to be shipped/forwarded back and forth between different storage nodes' memory (or storage resources) of the storage system, without impacting the overall performance of the storage system and in case a corresponding storage node's memory is not enough); (vi) the framework performs a method to partition one or more referenced segments to generate multiple reference tables (e.g., log-structured merge (LSM) trees) to reduce duplicated data/records across files (e.g., database files) and distribute corresponding workloads to multiple storage nodes; (vii) the framework generates a live reference table (level-by-level) in a memory and disk input/output (I/O) efficient way; and/or (viii) the framework identifies unactive segments for metadata garbage collection in a distributed fashion.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a key-value store (KVS) (135), an infrastructure node (IN) (140), a distributed dedupe storage platform (120), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the KVS (135), the IN (140), the distributed dedupe storage platform (120), and the network (130) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (140) are shown to be operatively connected through a communication network (e.g., 130), the clients (e.g., 110A, 110N, etc.) and the IN (140) may be directly connected (e.g., without an intervening communication network).

Further, the functioning of the clients (e.g., 110A, 110N, etc.) and the IN (140) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, data deduplication performed by a manager (127) of the storage platform (120), etc.), storage capacity (e.g., to store encrypted data across storage nodes (e.g., 125A, 125N, etc.) of the storage platform (120)), and data protection (e.g., software-defined data protection, disaster recovery, etc.) as a service to users (e.g., people) of clients (e.g., 110A, 110N, etc.). For example, the system may be configured to organize unbounded, continuously generated data into a data stream. The system (100) may also represent a comprehensive middleware layer executing on computing devices (e.g., 700, FIG. 7) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (140)) from the users. By doing so, the users may utilize different computing devices (e.g., 700, FIG. 7) that have different quantities of computing resources (e.g., processing cycles, memory, storage, etc.) while still being afforded consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as a universal serial bus (USB) device), etc.

In one or more embodiments, a client (e.g., 110A, 110N, etc.) may include functionality to, e.g.,: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (140)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (140). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (140) and/or the distributed dedupe storage platform (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.,: (i) collecting users' inputs, (ii) correlating collected users' inputs to the computer-implemented services to be provided to the users, (iii) communicating with the IN (140) and/or the distributed dedupe storage platform (120) that perform computations necessary to provide the computer-implemented services, (iv) using the computations performed by, for example, the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (140), the distributed dedupe storage platform (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Figure 7:
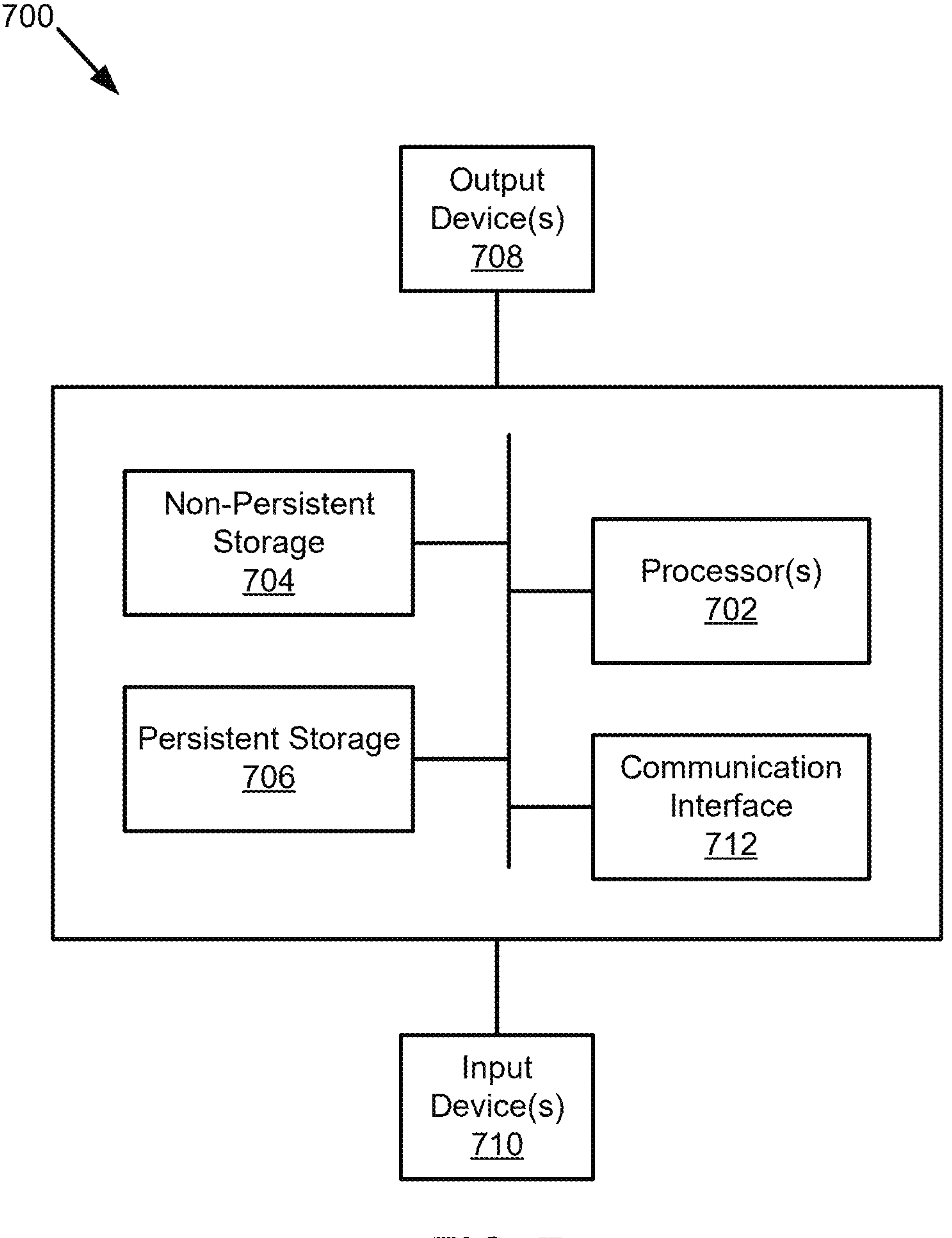
FIG. 7 shows a diagram of a computing device in accordance with one or more embodiments disclosed herein.

Further, in one or more embodiments, a client (e.g., 110A, 110N, etc.) may be implemented as a computing device (e.g., 700, FIG. 7). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 700, FIG. 7) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (140) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (140) may include functionality to, e.g.,: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the distributed dedupe storage platform (120) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide (in conjunction with the distributed dedupe storage platform (120)) software-defined data protection for the clients (e.g., 110A, 110N, etc.); (xii) provide (in conjunction with the distributed dedupe storage platform (120)) automated data discovery, protection, management, and recovery operations for the clients; (xiii) monitor operational states of the clients; (xiv) regularly back up configuration information of the clients to the distributed dedupe storage platform (120); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or distributed dedupe storage platform; (xvii) provide data deduplication (in conjunction with the distributed dedupe storage platform (120)); (xviii) orchestrate (in conjunction with the distributed dedupe storage platform (120)) data protection through one or more GUIs; (xix) empower data owners (e.g., users of the clients) to perform self-service data backup and restore operations from their native applications (in conjunction with the distributed dedupe storage platform (120)); (xx) ensure compliance and satisfy different types of service level objectives (SLOs) set by an administrator/user; (xxi) increase (in conjunction with the distributed dedupe storage platform (120)) resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (140) may communicate with, for example, the distributed dedupe storage platform (120) and/or other storage devices in the system (100).

As described above, the IN (140) may be capable of providing a range of functionalities/services to the users of the clients (e.g., 110A, 110N, etc.). However, not all users may be allowed to receive all the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (140) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups in connection with which embodiments disclosed herein may be employed include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of a CPU, memory, and a disk that those processes have access to.

As used herein, a "file system" is a method that an OS (e.g., Microsoft® Windows, Apple® MacOS, etc.) is used to control how data is named, stored, and retrieved. For example, once a user has logged into a computing device (e.g., 700, FIG. 7), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "volume" may be analogous to a logical unit number in a storage area network (SAN), in which a volume may be a subset of the distributed dedupe storage platform's (120) capacity presented by a storage node (e.g., 125A, 125N, etc.) as a local block device. A volume's data may be evenly distributed across all storage resources of the distributed dedupe storage platform (120), for example, according to a data layout selected for the distributed dedupe storage platform (120).

Further, while a single IN (e.g., 140) is considered above, the term "node" includes any collection of systems or sub-systems that individually or jointly execute a set, or multiple sets, of instructions to provide one or more computer-implemented services. For example, a single IN/server/host may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (140) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (140) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (140) may perform other functionalities without departing from the scope of the embodiments disclosed herein.

In one or more embodiments, the IN (140) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (140) may also be implemented as a logical device.

In the embodiments of the present disclosure, the KVS (135) (e.g., a key-value database) is demonstrated as a separate entity from the distributed dedupe storage platform (120); however, embodiments disclosed herein are not limited as such. The KVS (135) may be demonstrated as part of the distributed dedupe storage platform (e.g., as deployed to the platform, a sub-component within the platform, etc.).

In one or more embodiments, users (e.g., customers, administrators, people, etc.) and/or the distributed dedupe storage platform (120) may utilize the KVS (135) (for example, as an external/remote key-value manager) to generate, store, transmit, and/or delete keys (e.g., to perform key related operations) because (i) an external key-value manager may be more secure (which makes it much harder to covertly discover cryptographic keys) for generating, storing, transmitting, and/or deleting (e.g., forgetting, discarding, etc.) cryptographic keys than a data storage system and (ii) an external key-value manager is typically a fairly simple, self-contained system that is not downloading potentially malicious applications (e.g., software).

In one or more embodiments, the KVS (135) may refer to a data storage method that stores objects (e.g., metadata segments, application deployment information, API calls used to extract application deployment information, etc.) and associated keys. The keys may refer to hashes, numbers, and/or identifiers, which may be associated with particular objects stored to the KVS (135). In one or more embodiments, one or more keys may be used to quickly retrieve one or more objects (e.g., values associated with the keys) stored to the KVS (135).

In one or more embodiments, as being an external cryptographic key-value manager (remote to the distributed dedupe storage platform (120)), the KVS (135) may include a random number generator to generate cryptographic keys (e.g., encryption keys, decryption keys, etc.) for use (i) in encrypting data items for storage in a storage node (e.g., 125A, 125N, etc.) or (ii) in decrypting data items for retrieval from the corresponding drive of a storage node.

As described above, the KVS (135) may generate, store, transmit, and/or delete one or more keys for one or more volumes/drives of a storage node (e.g., 125A, 125N, etc.). Each key stored on the KVS (135) may be associated with a particular volume (e.g., a per-logical-volume key). In one or more embodiments, the KVS (135) may store a single key, as well as two or more keys (in which a second key may be generated by a KVS (not shown) and transmitted to the KVS (135) for storage). The KVS (135) may also store one or more keys for each volume. In other words, the distributed dedupe storage platform (120) may store multiple keys for a volume on the KVS (135) (which is coupled to the distributed dedupe storage platform (120)).

As used herein, "data item" is intended to be broadly construed to encompass, for example, a block, a chunk, file, object, or other grouping of data suitable for storage in the distributed dedupe storage platform (120).

As used herein, "encryption" (e.g., a symmetric or asymmetric encryption) is the process of encoding data based on a cryptographic key (e.g., the process of applying a model to a data chunk (e.g., a segment) using an encryption key to generate an encrypted data chunk). In this manner, only an authorized user/party having the appropriate cryptographic key is able to decrypt the data. An unauthorized user/party intercepting the encrypted data is unable to read or utilize the encoded data without the appropriate key. In one or more embodiments, a data encryption/decryption operation may be performed according to different cryptographic modes/models, for example (but not limited to): a cipher block chaining (CBC) mode, a ciphertext stealing (XTS) mode, a Galois/Counter Mode (GCM), etc.

In one or more embodiments, the KVS (135) may further include functionality to, e.g.,: (i) reliably discard (or delete) one or more child segments (stored as "values" or "child entries") referenced/pointed by a related parent segment (stored as a "key" or a "parent entry"); (ii) store one or more metadata segments of a segment tree (see FIG. 2); (iii) perform data protection related (or key related) operations (e.g., key management operations, key policy operations, key introduction operations, re-keying operations, managing existing keys, deleting older keys, etc.), in which (a) the key related operations may be used to manage how data is encrypted or decrypted, (b) the associated policies may determine when keys are introduced, how many keys are allowed, when data is rekeyed, and the like, and (c) the aforementioned operations may be independent of each other and may be performed asynchronously or synchronously; and/or (iii) include a module that perform the aforementioned operations using resources that are available (e.g., not being used by another workload) in the KVS (135), in which by using the available resources (or performing these operations in the background), the module may avoid having to specifically allocate resources to the operations that could impact the performance of other workloads. One of ordinary skill will appreciate that the KVS (135) may perform other functionalities without departing from the scope of the embodiments disclosed herein.

In one or more embodiments, the KVS (135) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the KVS described throughout the application.

Alternatively, in one or more embodiments, similar to a client (e.g., 110A, 110N, etc.), the KVS (135) may also be implemented as a logical device.

In one or more embodiments, the distributed dedupe storage platform (120) may be a scale-out storage platform (e.g., a storage cluster) that includes/hosts, at least, the manager (127) and any number of storage nodes (e.g., Storage Node A (125A), Storage Node N (125N), etc.).

In one or more embodiments, a storage node (e.g., 125A, 125N, etc.) may provide less, the same, or more functionalities and/or services (described above) compared to the IN (140). A software service/application may be installed/deployed (by a related user) to a node/server so that the node can be turned into a storage node (e.g., 125A, 125N, etc.) that contributes disks to the distributed dedupe storage platform (120). Working together, several storage nodes (e.g., 125A, 125N, etc.) may abstract local storage (e.g., object storage, block storage, etc.) and present volumes to the clients (e.g., 110A, 110N, etc.). Further, each software service may leverage storage resources (e.g., SSDs, storage class memory, spinning disk media, available RAM, etc.) of a corresponding "storage" node, and each storage node (e.g., 125A, 125N, etc.) may be a fault unit.

Referring to FIG. 1, (i) Storage Node A (125A) may be part of a first business operation region (BOR) and may execute on a first geographic location in the world and (ii) Storage Node N (125N) may be part of a second BOR and may execute on a second geographic location in the world, in which the first geographic location and the second geographic location may be distinct locations.

In one or more embodiments, as being a log-structured storage platform that processes incoming data from, for example, the clients (e.g., 110A, 110N, etc.) and/or from the IN (140) (via the manager (127)), the distributed dedupe storage platform (120) may be configured to, e.g.,: (i) store encrypted and/or unencrypted data (e.g., store any information utilized by the clients and/or by the IN such as full and incremental backups) across multiple physical storage nodes/units (e.g., 125A, 125N, etc.), (ii) perform data encryption and decryption operations (using cryptographic keys as well as generating or otherwise obtaining and updating such keys), (iii) perform data compression and decompression operations across one or more storage nodes, (iv) perform automatic data deduplication operations on unencrypted data ((a) to identify and eliminate redundant data during, for example, a data backup process (only unique data segments may be stored and duplicates may be replaced with references to optimize storage space) and (b) with the remaining data/content packed into one or more compression regions (not shown)) across one or more storage nodes, (v) service requests received from the clients (e.g., 110A, 110N, etc.) and/or the IN (140) to access data on the storage nodes (e.g., 125A, 125N, etc.); (vi) partition ingested data into discrete data chunks (e.g., segments, see FIG. 2) that are to be, for example, compared, identified as duplicate, and eventually removed (in which the partitioning may be performed with different granularity, using various criteria for data chunk boundaries as well as for their sizes); (vii) perform data synchronization and/or coordination among different storage nodes (e.g., 125A, 125N, etc.); (viii) store different types of data (e.g., files, data blocks, objects (where data may be wrapped into objects and identified by a unique identifier or a hash value)) that may be distributed across several computing devices (e.g., 125A, 125N, etc.); and/or (ix) provide high-performance and low-latency network access to one or more storage nodes (e.g., 125A, 125N, etc.) for users of a client (e.g., 110A, 110N, etc.) and/or the IN (140).

In one or more embodiments, a client (e.g., 110A, 110N, etc.) and/or the IN (140) may read and/or write data from/to memory and/or persistent storage device(s) (not shown) of one or more storage nodes (e.g., 125A, 125N, etc.) via an NVMe over fabric (NVMe-of) protocol, a remote direct memory access (RDMA) protocol, and/or a network file system (NFS) protocol. As a non-limiting example, a client (e.g., 110A, 110N, etc.) may execute connection software (not shown) that facilities a connection between the client and one or more storage endpoint(s) (e.g., a storage target, a storage node (e.g., 125A)) over the network (130). The storage node may persist data on NVMe storage devices (not shown) in which the client may execute connection software that is configured to connect to and access the NVMe storage devices of the storage node.

In one or more embodiments, a storage node (e.g., 125A, 125N, etc.) may be a computing device that, at least, executes software configured to handle (read and/or write) data in memory and/or physical storage device(s) of the storage node. Data stored to one or more storage device(s) across one or more storage node(s) (e.g., 125A, 125N, etc.) may be logically grouped into one or more storage volume(s) (not shown).

In one or more embodiments, a storage volume may be a logical storage structure that stores data for use by one or more clients (e.g., 110A, 110N, etc.) and/or the IN (140). A storage volume may be allocated (i) across one entire physical storage device, (ii) on a portion of one physical storage device, (iii) across two or more physical storage devices, (iv) across two or more portions of two or more physical storage devices, and/or (v) any combination thereof.

Further, in one or more embodiments, when a storage volume persists across two or more physical storage devices, those storage devices may be located in two or more storage nodes (e.g., 125A, 125N, etc.). Accordingly, a storage volume may provide a logical namespace that acts as a layer of indirection between software utilizing data and the data itself (e.g., software executing on a client (e.g., 110A) and the underlying physical storage devices located across one or more storage nodes (e.g., 125A, 125N, etc.)). Non-limiting examples of a storage volume may include an NVMe namespace, an NFS share, a redundant array of independent disks (RAID) array, etc.

In one or more embodiments, a storage node (e.g., 125A, 125N, etc.) may provide long-term, durable, high read/write throughput data storage/protection with near-infinite scale and low-cost. The storage node may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. In one or more embodiments, the storage node may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage node (e.g., 125A, 125N, etc.) may include a memory device (e.g., a dual in-line memory device), in which data is stored and from which copies of previously stored data are provided. As yet another example, the storage node may include a persistent storage device (e.g., an SSD), in which data is stored and from which copies of previously stored data is provided. As yet another example, the storage node may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

In one or more embodiments, unstructured and/or structured data (stored by a storage node (e.g., 125A)) may be updated (automatically) by the manager (127) when, for example, (but not limited to): newer system logs are received, a health state of a client (e.g., 110A) is changed, etc.

In one or more embodiments, through different types of virtualization, the distributed dedupe storage platform (120) (via the manager (127)) may present one or more storage nodes (e.g., 125A, 125N, etc.), for example, to a client (e.g., 110A, 110N, etc.) such that the storage nodes appear to be locally attached, ensuring the highest simultaneous access speed available for media and mission critical stored data.

Further, the distributed dedupe storage platform (120) may be used to, for example (but not limited to): improve application (and/or data) availability (e.g., via multiple data paths, internal fallback (e.g., hardware redundancy) mechanisms, etc.), enhance application performance of the clients (e.g., 110A, 110N, etc.) and/or the IN (140) (e.g., via off-load storage functions, segregate networks, etc.), increase storage utilization and effectiveness (e.g., by consolidating storage resources, providing tiered storage, etc.), etc.

As discussed above, the distributed dedupe storage platform (120) may provide data protection (e.g., data backup, data replication, data management, data restore, etc.) services to the clients (e.g., 110A, 110N, etc.) (or any other component of the system (100)) via the manager (127). The data protection services may initiate generation and storage of backups (e.g., block-based backups, file-based backups, etc.) in one or more storage nodes (e.g., 125A, 125N, etc.). The data protection services may also include restoration of, for example, the clients (e.g., 110A, 110N, etc.) (or any other component of the system (100)) to a restoration node (not shown) using the backups stored (temporarily or permanently) in the storage nodes.

Further, the distributed dedupe storage platform (120) may provide data protection services to the clients (e.g., 110A, 110N, etc.) (or any other component of the system (100)) by orchestrating (or scheduling): (i) generation of backups of the clients, (ii) storage of the generated backups of the clients, (iii) consolidation of one or more backup requests to reduce (or to prevent) generation of backups that are not useful for restoration purposes, and (iv) restoration of the clients to previous states using backups stored in one or more storage nodes (e.g., 125A, 125N, etc.).

Referring to FIG. 1, each storage node (e.g., 125A) may include an LSM tree (e.g., LSM Tree A). As used herein, an LSM tree is a data structure used for efficient data storage and retrieval in scenarios involving large volumes of data and frequent updates while being disk I/O friendly. Incoming data writes may be written into a fast in-memory data structure known as memtables, in which memtables may be sorted and written to a disk (of a related storage node) using a sorted string tables (SSTs) format (e.g., a format for storing key-value pairs in which keys are listed in a sorted order). As the number of SSTs grows, multiple SSTs may be merged to generate larger SSTs (e.g., reference tables), allowing for efficient data search across the related storage nodes (e.g., 125A, 125N, etc.).

Turning now to the manager (127), the manager (127) (e.g., a storage platform manager) may be a computing device that manages (e.g., creates, monitors, facilitates, modifies, removes, etc.), at least, one or more storage nodes (e.g., 125A, 125N, etc.), one or more storage volumes, and/or the connections among the storage nodes and the clients (e.g., 110A, 110N, etc.).

One of ordinary skill will appreciate that the manager (127) may perform other functionalities without departing from the scope of the embodiments disclosed herein. In one or more embodiments, the manager (127) may be configured to perform all, or a portion, of the functionalities described in FIGS. 6.1-6.3. The manager (127) may be implemented using hardware (e.g., any number of integrated circuits for processing computer readable instructions), software (e.g., a computer program), or any combination thereof.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the storage nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

While FIG. 1 shows a configuration of components, other system configurations may be used without departing from the scope of the embodiments disclosed herein.

Figure 2:
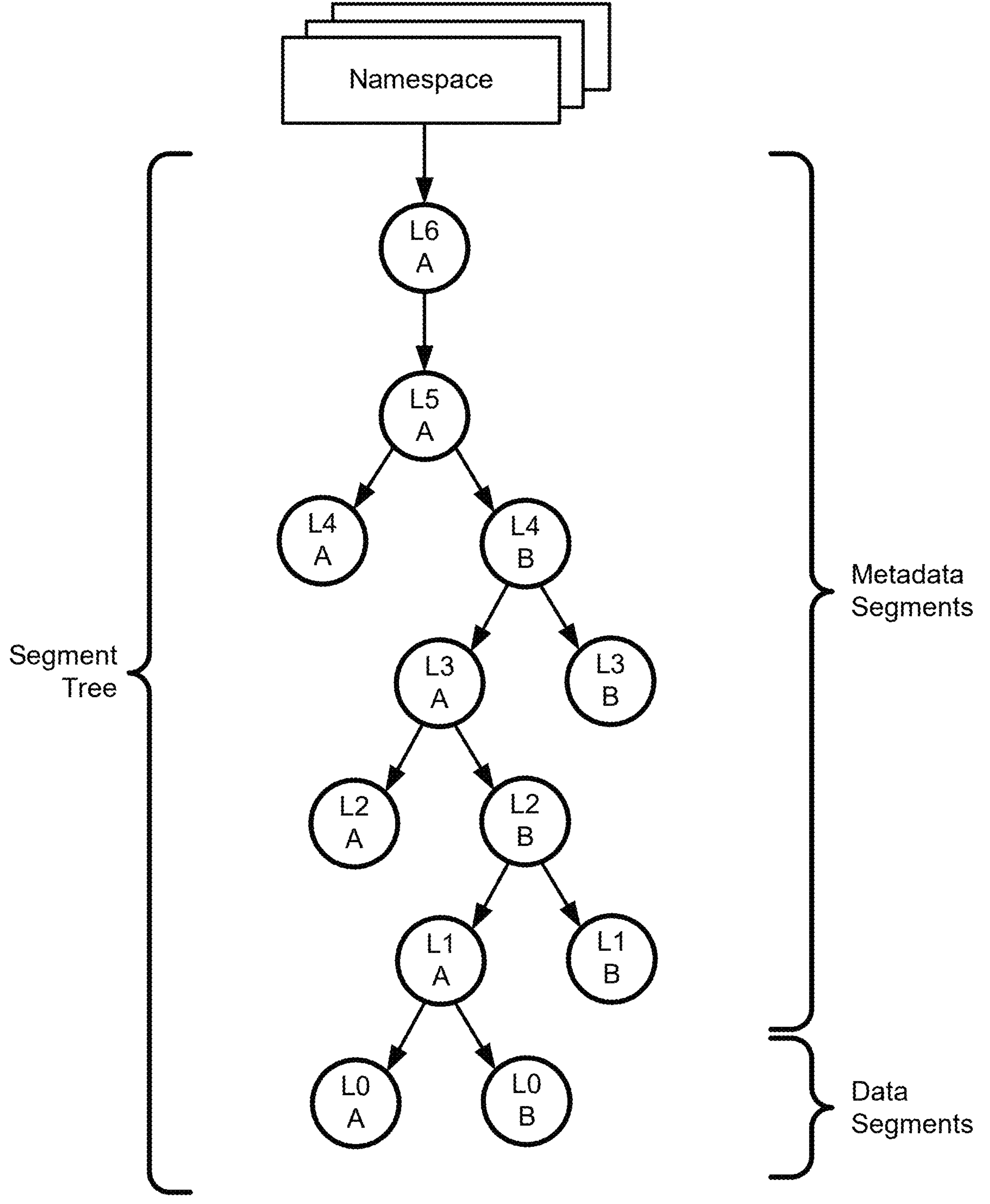
FIG. 2 shows an example segment tree in accordance with one or more embodiments disclosed herein.

Turning now to FIG. 2, FIG. 2 shows an example segment tree in accordance with one or more embodiments disclosed herein. The example, illustrated in FIG. 2 and described below, is for explanatory purposes only and not intended to limit the scope disclosed herein.

In one or more embodiments, the example segment tree may include, for example (but not limited to): one or more data segments (e.g., each data segment may be around 8 kilobytes (KB) in size), one or more metadata segments (e.g., each metadata segment may be around 4 KB in size), a namespace (e.g., a file handle, a content handle, etc.) of a file, etc.

In one or more embodiments, incoming user data (to the distributed dedupe storage platform (e.g., 120, FIG. 1)) may be segmented into variable size segments (by the manager (e.g., 127, FIG. 1)) on an average between 4 KB to 12 KB, with 8 KB segments being a useful average. More specifically, the manager may divide (or break) incoming storage objects (e.g., assets/data that are often compound storage objects including many individual storage objects) into one or more data chunks (e.g., segments, storage objects, etc.). Further, the manager (e.g., 127, FIG. 1) may generate a cryptographic hash value (e.g., a cryptographic fingerprint, a hash, etc.) for each segment using its hash calculation mechanism, for example, by employing a secure hash algorithm/model (e.g., SHA-1, SHA-256, etc.), in which, in the distributed dedupe storage platform (e.g., 120, FIG. 1), a fingerprint (of a segment) may be a 24-byte entity (e.g., a 24-byte message digest, a 24-byte reference, etc.) of an (average) 8 KB segment. To this end, files in the distributed dedupe storage platform (e.g., 120, FIG. 1) may be represented with a tree of fingerprints.

Figure 4:
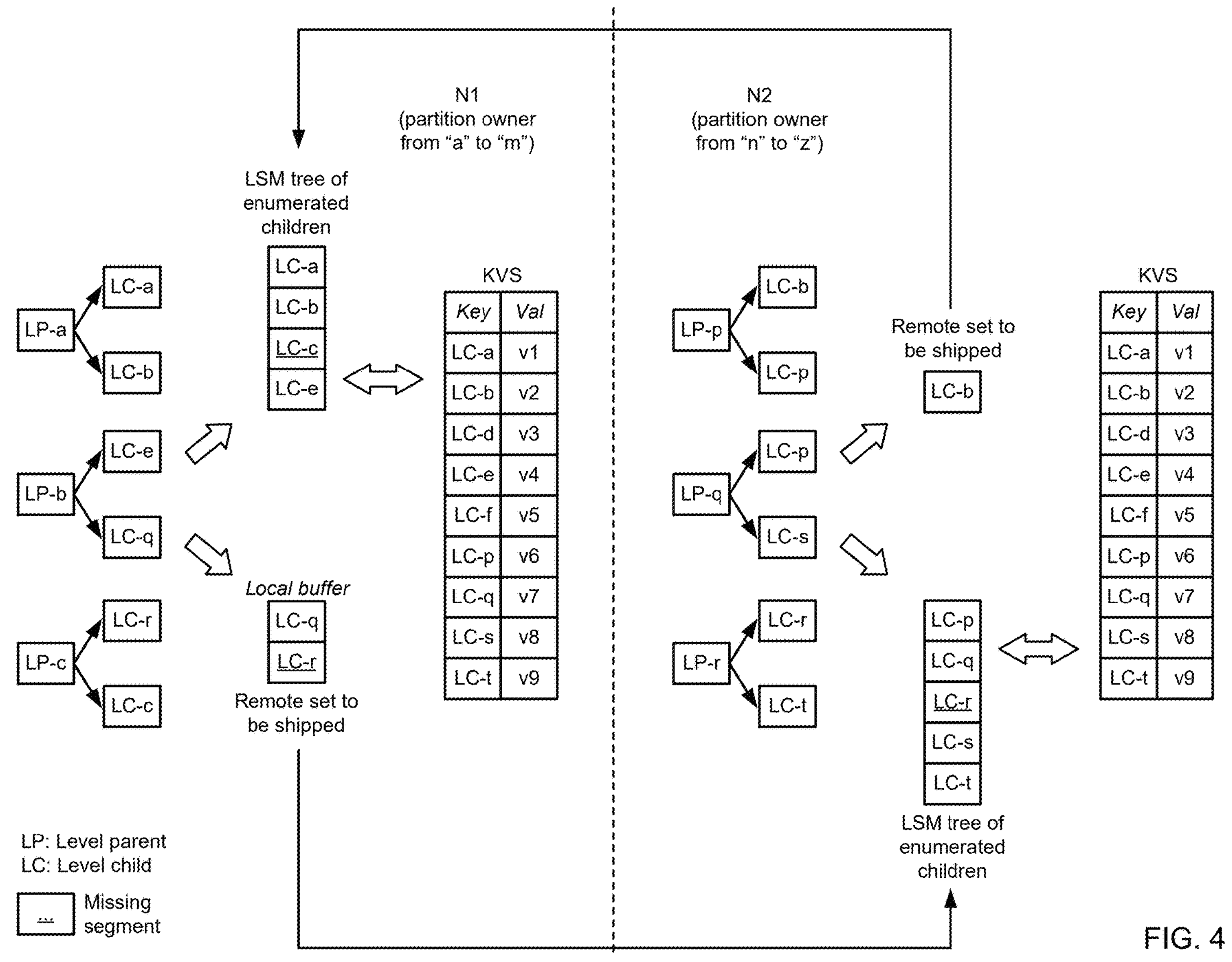
FIG. 4 shows an example distributed verification of references/segments for a level to detect missing segments in accordance with one or more embodiments disclosed herein.

In one or more embodiments, the manager (e.g., 127, FIG. 1) may maintain a "hash value lookup table" (e.g., a key-value table in the KVS (e.g., 135, FIG. 1), see e.g., FIG. 4) as storage object information (e.g., data chunk to hash value metadata). The hash value lookup table may represent (or specify) an index (e.g., a deduplication index, a deduplication directory, etc., which is utilized in detecting duplicate data chunks) where the hash values for stored data chunks may be maintained in that index. For example, a hash value of a data chunk (as being a digital signature that uniquely identifies an associated data chunk) being considered may be looked-up in the hash value lookup table. If an entry is found for that hash value, then a redundant data chunk is identified, and that data chunk may be replaced with a pointer to the matching data chunk (e.g., a pointer to a single copy of the matching data chunk) maintained in a storage node (e.g., in a corresponding drive of the storage node). In this manner, the manager may only store non-redundant data chunks in the corresponding drive.

As indicated above, the hash value lookup table may be maintained by the manager (e.g., 127, FIG. 1). The manager may add, remove, and/or modify information included in the hash value lookup table. The manager may do so based on information or a request/call obtained from administrators, other data structures, and/or from other sources (e.g., the IN (e.g., 140, FIG. 1)). The data structures of the hash value lookup table may be implemented using, for example, lists, tables, unstructured data, databases, etc. While described as being stored locally, the hash value lookup table (or various portions thereof) may be stored remotely and may be distributed across any number of devices (e.g., may be stored at alternative locations within the system (e.g., 100, FIG. 1)) without departing from the embodiments disclosed herein.

Referring to FIG. 2, with the help of the manager (e.g., 127, FIG. 1), a file system in the distributed dedupe storage platform (e.g., 120, FIG. 1) may use/implement a segregated architecture to store metadata and data (e.g., associated with files). For example, a file system of the distributed dedupe storage system (e.g., 120, FIG. 1) may use a segregated architecture to store metadata of files to the KVS (e.g., 135, FIG. 1) and to store the data of the files to a storage system (e.g., an external block storage system (e.g., a SAN system), an object storage system (e.g., a cloud-based storage system), one or more storage nodes of the distributed dedupe storage system, etc.).

In one or more embodiments, metadata may be a set of name-value pairs (and kept in corresponding metadata segments) that provides information about an object/file (e.g., time/date information when the file is last modified). In this "segment tree based file system", files may be stored as the example segment tree (where the files may be associated with data and metadata such that the files may be associated with metadata segments and L0 segments (data segments)), in which (i) the lowest level of the tree (e.g., Level 0 (L0) A segment, L0 B segment, etc.) may be a hash of user data (e.g., data chunks directly written by a user may be called as "L0 data segments") and (ii) the intermediate levels of the example segment tree (e.g., Level 1 (L1) segments (e.g., L1 A segment, L1 B segment, etc.), Level 2 (L2) segments (e.g., L2 A segment, L2 B segment, etc.), etc.) may be hashes of corresponding child nodes/segments (e.g., L1 A segment and L1 B segment may be referenced by a Level 2 (L2) segment).

More specifically, segments of user data (e.g., data segments, the data portion of the segment tree) may be called/assigned as L0 segments in the segment tree (and stored to a related storage node(s) (e.g., 125A, 125N, etc.)) and metadata segments (e.g., remaining segments of the segment tree) may be called as "Lp" segments (and stored to the KVS (e.g., 135, FIG. 1) as an index, where a "key" is a parent segment and a "value" is a child segment(s) hosted by the parent segment), in which "p" is a parameter that ranges from one to six (e.g., L1 through Level 6 (L6)) and indicates metadata representing (or related to) a corresponding file. Said another way, (a) metadata segments of the segment tree may include segments from L6 of the segment tree to L1 of the segment tree, (b) the metadata segments of the segment tree may be stored to the KVS, and (c) a key in the KVS may represent a parent segment and a value associated with the key may represent a set of child segments hosted by the parent segment.

Referring to the distributed dedupe storage platform (e.g., 120, FIG. 1), levels may be from L1 through L6 (where the storage system may support generation of the metadata segments up to L6), in which L6 is the highest level of the segment tree (e.g., the root of the segment tree). When two or more L0 segments are accumulated, an L1 "parent" segment may be formed (e.g., L1 A segment may be a parent of L0 A and L0 B "child" segments, in which L1 A segment may comprise cryptographic hash values of L0 A and L0 B segments). When the number of L0 segments exceeds the span of a L1 parent segment (e.g., L1 A segment), a second L1 parent segment (e.g., L1 B segment) may be formed, at which point an L2 segment (e.g., L2 B segment) may be formed (as a parent to L1 A and L1 B "child" segments (where the parent includes (e.g., points to, references, etc.) a collection of child segments (or child message digests/fingerprints)), from the perspective of L2 B segment). This may keep occurring until the file is completely created (in the file system).

As indicated, all files (in the file system) may have an L6 segment (e.g., L6 A segment) as the top segment, which, in turn, can point/reference to any of the lower-level segments between L5 segments through L0 segments (depending on the size of a related file). Said another way, each file of the data may be represented with an L6 segment and corresponding lower level segments in the segment tree depending on a size of each file. However, (a) L5 segments (e.g., L5 A segment) may only point to Level 4 (L4) segments (e.g., L4 A segment, L4 B segment, etc.), (b) LA segments (e.g., L4 A segment, L4 B segment, etc.) may only point to Level 3 (L3) segments (e.g., L3 A segment, L3 B segment, etc.), (c) L3 segments (e.g., L3 A segment, L3 B segment, etc.) may only point to L2 segments (e.g., L2 A segment, L2 B segment, etc.), (d) L2 segments (e.g., L2 A segment, L2 B segment, etc.) may only point to L1 segments (e.g., L1 A segment, L1 B segment, etc.), and (e) L1 segments (e.g., L1 A segment, L1 B segment, etc.) may only point to L0 segments (e.g., L0 A segment, L0 B segment, etc.).

Turning now to FIG. 3, FIG. 3 shows an example segment dataset bucketization (e.g., for parallel processing) in accordance with one or more embodiments disclosed herein. The example, illustrated in FIG. 3 and described below, is for explanatory purposes only and not intended to limit the scope disclosed herein.

Referring to FIG. 3, contents of a segment may be represented by a 24-byte fingerprint, which constitutes a 20-byte fingerprint (e.g., a 20-byte SHA1 fingerprint) and 4-byte checksum. In one or more embodiments, contents of a data segment (e.g., L0 A segment) may be user data and contents of a metadata segment (e.g., L3 A segment) may be metadata (e.g., a hash value of hash values associated with L2 A segment and L2 B segment).

In one or more embodiments, the example segment dataset may be partitioned (by the manager (e.g., 127, FIG. 1)) using at least N (e.g., 2) bits of a related fingerprint to allow the generation of 2^N buckets (e.g., Bucket 1, Bucket 2, Bucket 3, and Bucket 4). For example, a given fingerprint of an object may be a 20-byte SHA1 fingerprint, in which (i) the fingerprint may include five words (e.g., Word 0, Word 1, Word 2, Word 3, and Word 4) and (ii) each word (e.g., Word 0) may be formed based on four bytes (e.g., Byte 0, Byte 1, Byte 2, and Byte 3). Through segment dataset bucketization (or a bit-based bucketization) and depending on at least 2 bits (or depending on the combination of at least bits (e.g., 00, 10, 01, and 11)), for example, Byte 0 may be stored/mapped to Bucket 0 (and later retrieved from Bucket 0).

As used herein, a "bucket" is a logical structure that allows users to organize their data. For example, behind the scenes, the data may be distributed across two or more storage nodes (e.g., 125A, 125N, etc.) using buckets.

Turning now to FIG. 4, FIG. 4 shows an example distributed verification of references for a level to detect missing segments in accordance with one or more embodiments disclosed herein. The example, illustrated in FIG. 4 and described below, is for explanatory purposes only and not intended to limit the scope disclosed herein.

In one or more embodiments, the manager (e.g., 127, FIG. 1) may operate/communicate with a set of segment data stores (e.g., 125A, 125N, 135, etc.) to verify a segment (e.g., a data segment, a metadata segment, etc.) at a particular level (e.g., L0-L6, see FIG. 2), in which (i) a child level (e.g., L2 segments, FIG. 2) may be verified (by the manager), (ii) a related parent level (e.g., L3 segments, FIG. 2) may be enumerated to find references at the child level that the parent level points to, and/or (iii) the manager may perform (i)-(ii) in a bottom-up order to detect one or more impacted files in a single pass per level (e.g., performing, at least, (i)-(ii) while being flexible on memory consumption of a related data store; performing, at least, (i)-(ii) without affecting ongoing workloads of the related data store; etc.).

Further, the manager (e.g., 127, FIG. 1) may have a functionality to partition segments in a particular level using the least N bits of corresponding fingerprints to generate up to 2^N buckets and assign a node (e.g., a storage node) to one or more buckets for processing (in which the same node may be responsible for tracking one or more enumerated child segments that fall in a related bucket (via its LSM tree)). In one or more embodiments, this LSM tree may use the same sorting algorithm/model (e.g., a sorting model that allows for sorting a dataset in a lexicographical order) as the corresponding data store (e.g., the KVS (e.g., 135, FIG. 1)) hosting the child segments (e.g., child references) (so that, for example, when the manager (e.g., 127, FIG. 1) performs a comparison (see Step 616 of FIG. 6.1), a possible sorting related mismatch would be prevented).

As used herein, a lexicographical order may refer to an arrangement of characters, words, and/or numbers (e.g., in a dataset) in an alphabetical order (e.g., sorting the letters from A to Z).

Thereafter, the storage node may iterate a related parent level segments (or parent segments) in its assigned bucket range (e.g., to consider all the keys mapped to its assigned range), in which an iterated parent segment may be enumerated (by the manager (e.g., 127, FIG. 1)) to find/identify all the child segments the parent segment is referring to.

In one or more embodiments, child segments (e.g., Level Child (LC) a, LC-b, LC-e, etc.) that are falling into a bucket that is hosted by a related storage node (e.g., a local storage node) may be inserted into the storage node's (e.g., 125A, FIG. 1) LSM tree (e.g., by the manager (e.g., 127, FIG. 1) or a processor of the local storage node). Separately, child segments (e.g., LC-q, LC-r, etc.) that are falling into a bucket that is hosted by a "remote" storage node (e.g., 125N, FIG. 1) may be inserted into a local buffer of the local storage node (e.g., 125A, FIG. 1) that is mapped to the remote storage node. As the buffer fills up, the child segments (e.g., LC-q, LC-r, etc.) may be shipped (by the manager or the processor of the local storage node) to the remote storage node (or to a processor of the remote storage node), which is responsible for tracking the child segments for that bucket (and inserting those child segments to its local LSM tree). Thereafter, the manager (or the processor of the local storage node) may receive one or more child segments (e.g., LC-b) (that need to be inserted into the local storage node's LSM tree (which hosts enumerated child segments (e.g., LC-a, LC-b, LC-e, etc.)) from the remote storage node.

In one or more embodiments, once all keys (e.g., child segments) across all storage nodes of the distributed dedupe storage platform (e.g., 120, FIG. 1) are iterated (e.g., by a corresponding processor of each storage node or by the manager (e.g., 127, FIG. 1)), the manager may initiate a verification process. Referring to FIG. 4 and during the verification process (conducted in conjunction with the processor of the local storage node), the manager may (i) iterate enumerated child segments of a related storage node (listed in the LSM tree of that storage node, such as LC-a, LC-b, LC-c, and LC-e), in which (a) Level Parent (LP) a points to LC-a and LC-b, (b) LP-b points to LC-e and LC-q, and (c) LP-c points to LC-r and LC-c, and (ii) iterate (in parallel) "key-value" items (e.g., "LC-a (key)-v1 (value)", "LC-b (key)-v2 (value)", etc.) in the KVS (e.g., 135, FIG. 1) to compare against the enumerated child segments (e.g., to make sure that each of the enumerated child segments exists in the KVS).

Continuing with the discussion of FIG. 4, child segments found in the LSM tree but could not be found in the KVS (e.g., 135, FIG. 1) (such as LC-c and LC-r (indicated as underlined)) may be logged as missing segments. As discussed above, iterations for both datasets (e.g., child segments) in the LSM tree and the KVS are sequential with zero out of order retrieval of data, as the entries in the LSM tree and the KVS are sorted using the same sorting model (e.g., for efficient processing of the child segments).

Thereafter, based on the missing segments (e.g., LC-c, LC-r, etc.) (by keeping track of the missing segments), the manager (e.g., 127, FIG. 1) (in conjunction with the processor of the local storage node) may go one level up in the segment tree (of the local storage node) to identify (and/or enumerate) a parent segment of each of the missing segments (e.g., LP-c as the parent segment of LC-c (which is hosted in the local storage node's (Node 1 (N1) LSM tree, in which N1 is the owner of LCs from "LC-a" to "LC-m") and that is why listed in the local storage node's LSM tree as an enumerated child segment) and LC-r (which is not hosted in the local storage node and that is why considered as a child segment that needs to be shipped to the remote storage node (N2, which is the owner of LCs from "LC-n" to "LC-z")), etc.).

In one or more embodiments, similar to the verification process performed for the local storage node (for all levels such as L0-L6, see FIG. 2, to identify a missing segment(s) in each level of a corresponding segment tree), the manager (in conjunction with the processor of the remote storage node) may perform a second verification process for the remote storage node in parallel. As a result of the second verification process, the manager (in conjunction with the processor of the remote storage node) may (i) identify LC-r as a missing segment and (ii) go one level up in the related segment tree (of the remote storage node) to identify (and/or enumerate) a parent segment of the missing segment (e.g., LP-r as the parent segment of LC-r (which is hosted in N2), and (iii) identify LC-b (which is not hosted in the remote storage node's LSM tree) as a child segment that needs to be shipped to the local storage node (N1).

Figure 5:
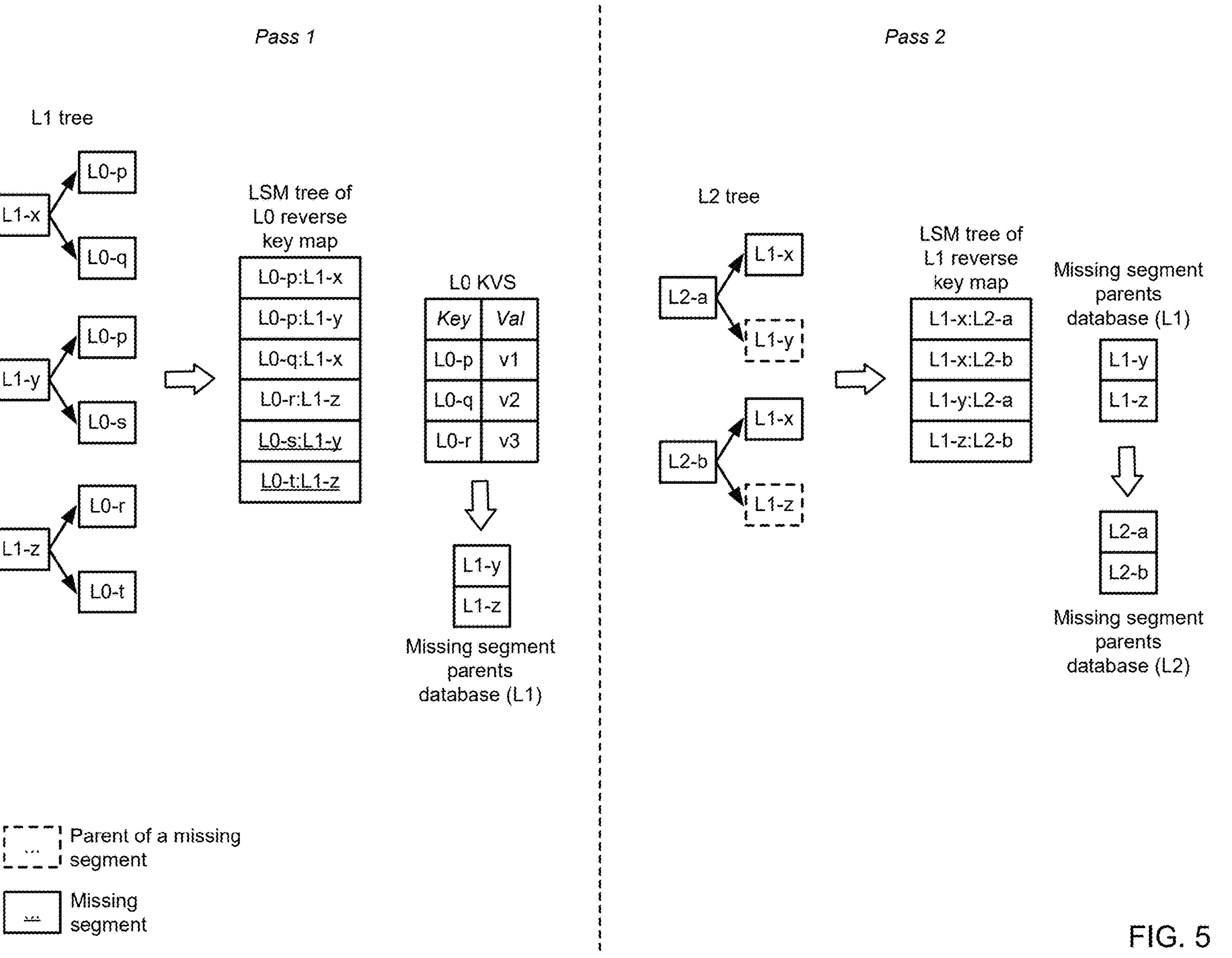
FIG. 5 shows an example detection of missing segments and impacted files in a single pass in accordance with one or more embodiments disclosed herein.

Turning now to FIG. 5, FIG. 5 shows an example detection of missing segments and impacted files in a single pass in accordance with one or more embodiments disclosed herein. The example, illustrated in FIG. 5 and described below, is for explanatory purposes only and not intended to limit the scope disclosed herein.

In one or more embodiments, the manager (e.g., 127, FIG. 1) (in conjunction with processors of related storage nodes) may perform an integrated detection of a missing segment(s) (as discussed above in reference to FIG. 4) and files impacted by the missing segments (by employing linear, non-linear, and/or ML models). Referring to FIG. 5, when a child segment/reference is enumerated (e.g., L0-p, L0-q, etc.), the child segment may be inserted as a combination/pair of the child segment and a parent segment that refers to the child segment (e.g., using a "child-segment: parent-segment" pair format (a combined key) such as "L0-p: L1-x", "L0-q: L1-x", etc.), and an LSM tree of a reverse key map (for a corresponding level) can be generated (e.g., an LSM tree of L0 reverse key map) and stored. In this way, one or more "impacted" parent segments of a missing child segment(s) can be identified and tracked easily.

Further, as being a parent segment, (i) L1-x points to L0-p and L0-q, (ii) L1-y points to L0-p and L0-s, (iii) L1-z points to L0-r and L0-t, (iv) L2-a points to L1-x and L1-y, and (v) L2-b points to L1-x and L1-z. Based on the aforementioned combined key structure/format, when an enumerated child segment is found missing as a result of a single pass (e.g., Pass 1) performed in L0 (e.g., could not be found in L0 KVS (L0 related section of the KVS (e.g., 135, FIG. 1)), the parent segment of that child segment (available from the pair format) can be inserted (by the manager (e.g., 127, FIG. 1)) into a related LSM tree (e.g., a missing segment parents database (L1)) (to log L1-y and L1-z as missing segments) that tracks parent segments of missing child segments in L1.

For example, after the verification process is performed for L0 (e.g., as a result of Pass 1), L0-s and L0-t may be found as missing child segments. Based on the LSM tree of L0 reverse key map and the pair format, the manager (e.g., 127, FIG. 1) may identify (i) L1-y as a missing parent segment (because L0-s is a missing segment) and (ii) L1-z as a missing parent segment (because L0-t is a missing segment). Thereafter, once the verification process is performed for L1 (e.g., as a result of Pass 2) and based on the LSM tree of L1 reverse key map and its pair format (e.g., "L1-x: L2-a", "L1-x: L2-b", etc.), the manager (e.g., 127, FIG. 1) may identify (i) L2-a as a missing parent segment (because L1-y was identified as a missing segment after Pass 1) and (ii) L2-b as a missing parent segment (because L1-z was identified as a missing segment after Pass 1). The manager may then populate a related LSM tree (e.g., a missing segment parents database (L2)) to insert L2-a and L2-b into the LSM tree (e.g., to log L2-a and L2-b as missing segments).

Without departing from the scope of the embodiments disclosed herein, the manager (e.g., 127, FIG. 1) may perform the aforementioned process(es) for each level (e.g., L0-L6, see FIG. 2) that forms a file(s) (so that, after iterating each file's namespace, the manager can directly identify/discover one or more files that are impacted because of missing segments (in each level of a related segment tree)).

FIGS. 6.1-6.3 show a method for managing data in a storage system (e.g., the distributed dedupe storage platform (e.g., 120, FIG. 1)) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 6.1, the method shown in FIG. 6.1 may be executed by, for example, the above-discussed manager (e.g., 127, FIG. 1) (in conjunction with processors of corresponding storage nodes (e.g., 125A, 125N, FIG. 1)). Other components of the system (100) illustrated in FIG. 1 may also execute all or part of the method shown in FIG. 6.1 without departing from the scope of the embodiments disclosed herein.

In Step 600, by employing linear, non-linear, and/or ML models, the manager partitions one or more segments (e.g., data segments, L0 segments, etc.) in a particular level (e.g., L0) using at least N bits of corresponding fingerprints to generate 2^N buckets. In one or more embodiments, the segments may be related to a segment tree (see FIG. 2). In Step 602, the manager assigns one or more buckets (e.g., a portion) of the 2^N buckets to a storage node (e.g., a first storage node) of the storage system. Thereafter, in Step 604, the manager collects one or more child segments of the level. For example, the manager may collect a partition of the L0 segments that is assigned to the first storage node as child segments.

In Step 606, by employing linear, non-linear, and/or ML models, the manager identifies (i) a first set of child segments of the child segments that maps to the portion of the buckets of the first storage node and (ii) a second set of child segments of the child segments that maps to a bucket of a second storage node of the storage system. In Step 608, the manager inserts/stores (i) each of the first set of child segments to an LSM tree of the first storage node (by following the "child-segment: parent-segment" pair format, see FIG. 5) and (ii) the second set of child segments to a buffer that is mapped to the second storage node (see FIG. 4).

In Step 610, once the buffer is filled up, the manager sends/provides the second set of child segments to the second storage node. In Step 612, in response to Step 610, the manager receives a third set of child segments (e.g., which may be part of the first set of child segments) that maps to the buckets of the first storage node from the second storage node. In Step 614, the manager inserts/stores/populates the third set of child segments to the LSM tree of the first storage node (by following the pair format). In Step 616, the manager compares the first set of child segments and the third set of child segments (of the LSM tree) against second child segments of the KVS (e.g., 135, FIG. 1) for the level (e.g., listed for L0 of the segment tree). Following Step 616, the method proceeds to Step 618 of FIG. 6.2.

Turning now to FIG. 6.2, the method shown in FIG. 6.2 may be executed by, for example, the above-discussed manager (in conjunction with processors of corresponding storage nodes). Other components of the system (100) illustrated in FIG. 1 may also execute all or part of the method shown in FIG. 6.2 without departing from the scope of the embodiments disclosed herein.

In Step 618, based on Step 616 of FIG. 6.1 (e.g., based on the comparing), the manager makes a first determination (in real-time or near real-time) as to whether a mismatch has occurred. Accordingly, in one or more embodiments, if the result of the first determination is YES (e.g., because a fourth set of child segments of the LSM tree could not be found in the KVS, the mismatch has occurred), the method proceeds to Step 620. If the result of the first determination is NO, the method may alternatively end.

In Step 620, as a result of the first determination in Step 618 being YES, the manager identifies/logs the fourth set of child segments (that could not be found in the KVS (for this level)) as missing segments (e.g., L0 missing segments). In Step 622, after logging the fourth set of child segments (e.g., which may be part of the first set of child segments) as the missing segments, the manager identifies, based on the pair format (see Step 608 of FIG. 6.1), parent segments (in the segment tree) that reference each of the missing segments. In Step 624, the manager logs the parent segments to the LSM tree as the parent segments that track the missing segments.

Thereafter, in Step 626, by moving one level up (e.g., L0→L1) in the segment tree and based on the parent segments, the manager identifies a grandparent segment of the missing segments. For example, by moving from L0 to L1 (in the segment tree) and based on the parent segments, the manager may identify a fifth set of child segments (at L1) as a grandparent segment(s) of the missing segments (e.g., L1 missing segments, the top level segment of the segment tree pointing to (or affected by) the L0 missing segments, etc.).

In Step 628, based on Step 626 (e.g., based on identifying the grandparent segment(s)), the manager makes a second determination (in real-time or near real-time) as to whether no level is left (in the segment tree) to move up. Accordingly, in one or more embodiments, if the result of the second determination is YES (e.g., because the grandparent segment is the highest-level segment (e.g., an L6 segment) in the segment tree), the method proceeds to Step 630 of FIG. 6.3. If the result of the second determination is NO, the method alternatively returns to Step 626 (e.g., to move one level up in the segment tree (e.g., L2, L3, L4, etc.) and perform identification of related child segments at that level). Following Step 628, the method proceeds to Step 630 of FIG. 6.3.

Turning now to FIG. 6.3, the method shown in FIG. 6.3 may be executed by, for example, the above-discussed manager (in conjunction with processors of corresponding storage nodes). Other components of the system (100) illustrated in FIG. 1 may also execute all or part of the method shown in FIG. 6.3 without departing from the scope of the embodiments disclosed herein.

In Step 630, as a result of the second determination in Step 628 being YES (e.g., based on the top level (or the highest-level) segment), the manager identifies a list of files impacted/affected by the L0 missing segments. Thereafter, in Step 632, the manager initiates, via a GUI (e.g., of itself, of a corresponding storage node, of a client, etc.), display of the list of files impacted by the L0 missing segments to a user (e.g., of the client). In one or more embodiments, the method may end following Step 632.

Turning now to FIG. 7, FIG. 7 shows a diagram of a computing device in accordance with one or more embodiments disclosed herein.

In one or more embodiments disclosed herein, the computing device (700) may include one or more computer processors (702), non-persistent storage (704) (e.g., volatile memory, such as RAM, cache memory), persistent storage (706) (e.g., a non-transitory computer readable medium, a hard disk, an optical drive such as a CD drive or a DVD drive, a Flash memory, etc.), a communication interface (712) (e.g., Bluetooth interface, infrared interface, network interface, optical interface, etc.), an input device(s) (710), an output device(s) (708), and numerous other elements (not shown) and functionalities. Each of these components is described below.

In one or more embodiments, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (e.g., a LAN, a WAN, Internet, mobile network, etc.) and/or to another device, such as another computing device.

In one or more embodiments, the computing device (700) may include one or more output devices (708), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data in a storage system, the method comprising:

partitioning Level 0 (L0) segments of a segment tree to generate buckets;

assigning a portion of the buckets to a first storage node of the storage system;

collecting a partition of the L0 segments assigned to the first storage node as child segments;

identifying:

a first set of child segments of the child segments that maps to the portion of the buckets of the first storage node, and a second set of child segments of the child segments that maps to a bucket of a second storage node of the storage system;

storing:

each of the first set of child segments to a log-structured merge (LSM) tree of the first storage node by following a child-segment: parent-segment pair format, the second set of child segments to a buffer that is mapped to the second storage node;

sending, once the buffer is filled, the second set of child segments to the second storage node;

receiving a third set of child segments that maps to the portion of the buckets from the second storage node;

storing the third set of child segments to the LSM tree by following the format;

comparing the first set of child segments and the third set of child segments of the LSM tree against second child segments of a key-value store (KVS) listed for an L0 of the segment tree;

making, based on the comparing, a determination that a mismatch occurred, wherein, because a fourth set of child segments of the LSM tree could not be found in the KVS, the mismatch occurred; and logging, based on the determination, the fourth set of child segments as missing segments.

2. The method of claim 1, further comprising:

after logging the fourth set of child segments as the missing segments:

identifying, based on the format, parent segments in the segment tree that reference the missing segments;

logging the parent segments to the LSM tree as the parent segments that track the missing segments;

identifying, by moving one level up in the segment tree and based on the parent segments, a grandparent segment of the missing segments;

making, based on identifying the grandparent segment, a second determination that the grandparent segment is a highest-level segment in the segment tree, wherein the grandparent segment is a Level 6 (L6) segment in the segment tree;

identifying, based on the grandparent segment, a list of files impacted by the missing segments; and initiating, using a graphical user interface (GUI), display of the list of files to a user.

3. The method of claim 1, wherein the storage system is a distributed dedupe storage system, wherein a file system of the distributed dedupe storage system uses a segregated architecture to store metadata of files to the KVS and to store the data of the files to a plurality of storage nodes of the distributed dedupe storage system, and wherein the plurality of storage nodes comprises the first storage node and the second storage node.

4. The method of claim 3, wherein the files are stored as the segment tree, wherein segments of the data are assigned as the L0 segments in the segment tree, wherein the L0 segments are the lowest level segments in the segment tree, wherein remaining segments of the segment tree are assigned as metadata segments, wherein the files are associated with the metadata segments and the L0 segments.

5. The method of claim 4, wherein, when two or more L0 segments are accumulated, a Level 1 (L1) segment is generated in the segment tree, wherein the L1 segment is a metadata segment and the L1 segment comprises cryptographic hash values of the L0 segments, wherein the distributed dedupe storage system supports generation of the metadata segments up to a Level 6 (L6) segment, and wherein each file of the data is represented with the L6 segment and corresponding lower level segments in the segment tree depending on a size of each file.

6. The method of claim 5, wherein the metadata segments of the segment tree comprise segments from an L6 of the segment tree to an L1 of the segment tree, wherein the metadata segments of the segment tree are stored to the KVS, and wherein a key in the KVS represents a parent segment and a value associated with the key represents a plurality of child segments hosted by the parent segment.

7. The method of claim 1, wherein the L0 segments are data segments of the segment tree.

8. The method of claim 7, wherein the L0 segments are partitioned using at least N bits of cryptographic hash values of the L0 segments to generate the buckets.

9. A non-transitory computer readable medium comprising computer readable program code, which when executed by a computer processor enables the computer processor to perform a method for managing data in a storage system, the method comprising:

partitioning Level 0 (L0) segments of a segment tree to generate buckets;

assigning a portion of the buckets to a first storage node of the storage system;

collecting a partition of the L0 segments assigned to the first storage node as child segments;

identifying:

a first set of child segments of the child segments that maps to the portion of the buckets of the first storage node, and a second set of child segments of the child segments that maps to a bucket of a second storage node of the storage system;

storing:

each of the first set of child segments to a log-structured merge (LSM) tree of the first storage node by following a child-segment: parent-segment pair format, the second set of child segments to a buffer that is mapped to the second storage node;

sending, once the buffer is filled, the second set of child segments to the second storage node;

receiving a third set of child segments that maps to the portion of the buckets from the second storage node;

storing the third set of child segments to the LSM tree by following the format;

comparing the first set of child segments and the third set of child segments of the LSM tree against second child segments of a key-value store (KVS) listed for an L0 of the segment tree;

making, based on the comparing, a determination that a mismatch occurred, wherein, because a fourth set of child segments of the LSM tree could not be found in the KVS, the mismatch occurred; and logging, based on the determination, the fourth set of child segments as missing segments.

10. The non-transitory computer readable medium of claim 9, further comprising:

after logging the fourth set of child segments as the missing segments:

identifying, based on the format, parent segments in the segment tree that references the missing segments;

logging the parent segments to the LSM tree as the parent segments that track the missing segments;

identifying, by moving one level up in the segment tree and based on the parent segments, a grandparent segment of the missing segments;

making, based on identifying the grandparent segment, a second determination that the grandparent segment is a highest-level segment in the segment tree, wherein the grandparent segment is a Level 6 (L6) segment in the segment tree;

identifying, based on the grandparent segment, a list of files impacted by the missing segments; and initiating, using a graphical user interface (GUI), display of the list of files to a user.

11. The non-transitory computer readable medium of claim 9, wherein the storage system is a distributed dedupe storage system, wherein a file system of the distributed dedupe storage system uses a segregated architecture to store metadata of files to the KVS and to store the data of the files to a plurality of storage nodes of the distributed dedupe storage system, and wherein the plurality of storage nodes comprises the first storage node and the second storage node.

12. The non-transitory computer readable medium of claim 11, wherein the files are stored as the segment tree, wherein segments of the data are assigned as the L0 segments in the segment tree, wherein the L0 segments are the lowest level segments in the segment tree, and wherein remaining segments of the segment tree are assigned as metadata segments.

13. The non-transitory computer readable medium of claim 12, wherein, when two or more L0 segments are accumulated, a Level 1 (L1) segment is generated in the segment tree, wherein the L1 segment is a metadata segment and the L1 segment comprises cryptographic hash values of the L0 segments, wherein the distributed dedupe storage system supports generation of the metadata segments up to a Level 6 (L6) segment, and wherein each file of the data is represented with the L6 segment and corresponding lower level segments in the segment tree depending on a size of each file.

14. The non-transitory computer readable medium of claim 13, wherein the metadata segments of the segment tree comprise segments from an L6 of the segment tree to an L1 of the segment tree, wherein the metadata segments of the segment tree are stored to the KVS, and wherein a key in the KVS represents a parent segment and a value associated with the key represents a plurality of child segments hosted by the parent segment.

15. The non-transitory computer readable medium of claim 9, wherein the L0 segments are data segments of the segment tree.

16. The non-transitory computer readable medium of claim 15, wherein the L0 segments are partitioned using at least N bits of cryptographic hash values of the L0 segments to generate the buckets.

17. A system for managing data in a storage system, the system comprising:

a processor comprising circuitry;

memory comprising instructions, which when executed by the processor perform a method, the method comprising:

partitioning Level 0 (L0) segments of a segment tree to generate buckets;

assigning a portion of the buckets to a first storage node of the storage system;

collecting a partition of the L0 segments assigned to the first storage node as child segments;

identifying:

a first set of child segments of the child segments that maps to the portion of the buckets of the first storage node, and a second set of child segments of the child segments that maps to a bucket of a second storage node of the storage system;

storing:

each of the first set of child segments to a log-structured merge (LSM) tree of the first storage node by following a child-segment:parent-segment pair format, the second set of child segments to a buffer that is mapped to the second storage node;

sending, once the buffer is filled, the second set of child segments to the second storage node;

receiving a third set of child segments that maps to the portion of the buckets from the second storage node;

storing the third set of child segments to the LSM tree by following the format;

comparing the first set of child segments and the third set of child segments of the LSM tree against second child segments of a key-value store (KVS) listed for an L0 of the segment tree;

making, based on the comparing, a determination that a mismatch occurred, wherein, because a fourth set of child segments of the LSM tree could not be found in the KVS, the mismatch occurred; and logging, based on the determination, the fourth set of child segments as missing segments.

18. The system of claim 17, further comprising:

after logging the fourth set of child segments as the missing segments:

identifying, based on the format, parent segments in the segment tree that references the missing segments;

logging the parent segments to the LSM tree as the parent segments that track the missing segments;

identifying, by moving one level up in the segment tree and based on the parent segments, a grandparent segment of the missing segments;

making, based on identifying the grandparent segment, a second determination that the grandparent segment is a highest-level segment in the segment tree, wherein the grandparent segment is a Level 6 (L6) segment in the segment tree;

identifying, based on the grandparent segment, a list of files impacted by the missing segments; and initiating, using a graphical user interface (GUI), display of the list of files to a user.

19. The system of claim 17, wherein the storage system is a distributed dedupe storage system, wherein a file system of the distributed dedupe storage system uses a segregated architecture to store metadata of files to the KVS and to store the data of the files to a plurality of storage nodes of the distributed dedupe storage system, and wherein the plurality of storage nodes comprises the first storage node and the second storage node.

20. The system of claim 19, wherein the files are stored as the segment tree, wherein segments of the data are assigned as the L0 segments in the segment tree, wherein the L0 segments are the lowest level segments in the segment tree, and wherein remaining segments of the segment tree are assigned as metadata segments.

* * * * *